(12) United States Patent
Davies et al.

(10) Patent No.: US 6,763,224 B2
(45) Date of Patent: Jul. 13, 2004

(54) LOW LEVEL MOBILITY MANGAEMENT PROCEDURES

(75) Inventors: Robert J. Davies, Horley (GB); Paul M. Fulton, Salfords (GB); Robert L. Blake, Crewe (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 521 days.

(21) Appl. No.: 09/954,645

(22) Filed: Sep. 18, 2001

(65) Prior Publication Data

US 2002/0055333 A1 May 9, 2002

(30) Foreign Application Priority Data

Sep. 20, 2000 (GB) .............................................. 0023182

(51) Int. Cl.[7] .................................................. H04B 7/00
(52) U.S. Cl. ........................ 455/41.2; 455/450; 455/517
(58) Field of Search ............................... 455/41, 452.1, 455/450, 403.1, 517, 445; 370/331

(56) References Cited

U.S. PATENT DOCUMENTS 5,835,861 A   11/1998   Whiteside .................. 455/466
6,278,877 B1 *  8/2001   Brederveld et al. .......... 455/434
6,654,611 B2 * 11/2003   Tiedemann, Jr. ............ 455/450

* cited by examiner

Primary Examiner—Melur Ramakrishnaiah
(74) Attorney, Agent, or Firm—Dicran Halajian (57) ABSTRACT

A data transmission system comprises a large number of networked data beacons interconnected and grouped together in respective clusters. In the system, a first (12) and two or more second (13, 14, 15) beacon devices are interconnected (11) as a cluster capable of wireless message transmission, and at least one mobile device (10) capable of receiving such message transmissions. The first beacon (12) is arranged to broadcast a series of inquiry messages (INQ) according to a first communications protocol, such as Bluetooth, but with the addition of an identifier for the cluster (CL). The mobile device (10) detects such inquiry messages and replies with an identifier for itself, together with message reason data. The link (A) from the first beacon device is then re-established between a selected one (14) of the second beacon devices, with interaction between the mobile device (10) and selected second beacon device (14) being controlled at least partly by the message reason data.

8 Claims, 5 Drawing Sheets

LOW LEVEL MOBILITY MANGAEMENT PROCEDURES

The present invention relates to methods for use in data delivery and communications systems, and to systems effecting the same and comprising one or a plurality of mobile data processing or communications devices interacting with one or several groups or clusters of networked data delivery and/or transmission beacons.

An example of a mobile data processing device interacting with a fixed device is given in U.S. Pat. No. 5,835,861 which describes the use of wireless telephones with a beacon in the form of an electronic advertisement billboard. The user of a wireless telephone obtains the telephone number of a vendor by activating his/her wireless telephone to transmit a prompt signal to an active advertisement source and to receive from the advertisement source a response signal containing the telephone number of the advertising vendor. The telephone number can then be used to automatically place a call to that vendor via the public switched telephone network. Alternatively, the telephone number can be stored for use later on. This arrangement can be used to place a call to a vendor without having to either memorise the telephone number or to write it down. The signals between the billboard and the caller can be transmitted as modulated infrared (IR) signals.

It will be recognised that an important requirement for such mobile data processing or communications devices is that they quickly and efficiently gather data from beacons such that the user is not required to undertake actions such as staying close to a beacon whilst contact is established between portable device and beacon, nor having to specifically initiate interaction (as is the case with the above-mentioned system in U.S. Pat. No. 5,835,861).

As is described in our pending United Kingdom patent application no. 0020101.2 (PHGB000112), the existing methodology for implementing a radio beacon is to perform a two-step connection process, commencing with the discovery of devices followed by the actual transmission of the information using the same device. Bluetooth, one of the technologies/protocols available for building such systems, requires that the discovery phase is completed before a transmission can take place. When used in a dynamic mobile environment, the time this process takes can often be longer than the actual time the device is in range, causing the information not to reach the client.

Due to the mobility of the clients and the typically small range of beacons, data delivery systems will typically be provided via a networked cluster (or several clusters) of beacons. In consequence, it is not just the time taken for a transaction to be performed that is important since there is still the likelihood that the client will be out of range of a given beacon and will not have received all the service information.

It is an object of the invention to provide an improved system for the delivery of data via beacons.

In accordance with a first aspect of the present invention there is provided a method for enabling the user of a mobile data processing device to perform a service interaction with a networked arrangement of beacons, said arrangement being subdivided into respective clusters of beacons, with a cluster of beacon devices containing a first and plural second beacon devices capable of wireless message transmission, wherein:

a first beacon of a cluster broadcasts a series of inquiry messages according to a first communications protocol, and including respective identifiers for the beacon and cluster;

the users mobile device, on detecting such inquiry messages, replies with an identifier for the mobile device, together with message reason data;

the first beacon device transmits a received identifier and message reason data to a selected second beacon device; and the selected second beacon and mobile device perform a service interaction based at least partly on the message reason data, including establishing a communications link for performance of said service interaction when indicated by the message reason data.

Also in accordance with the present invention there is provided a data transmission system comprising a plurality of networked beacon devices, said devices being subdivided into respective clusters of beacons, with a cluster containing a first and two or more second beacon devices capable of wireless message transmission, and at least one mobile device capable of receiving such message transmissions, wherein said first beacon is arranged to broadcast a series of inquiry messages according to a first communications protocol, and including respective identifiers for the beacon and cluster, wherein said at least one mobile device is arranged to detect such inquiry messages and reply with an identifier for the mobile device and message reason data, wherein said first beacon device is arranged to transmit a received identifier and message reason data to a selected one of said two or more second beacon devices, and wherein said selected second beacon and mobile device are configured to perform a service interaction based at least partly on the message reason data, including establishing a communications link for performance of said service interaction when indicated by the message reason data.

Further features and advantages of the present invention are also recited in the attached claims, the disclosure of which is incorporated herein by reference and to which the reader is now directed, or will become apparent from reading of the following description of embodiments of the invention.

Preferred embodiments of the invention will now be described, by way of example only, and with reference to the accompanying drawing, in which.

In the following description we consider particularly a system which utilises Bluetooth protocols for communication of messages from one or a series of beacons to a portable device (whether telephone, PDA or other) although, as will be recognised, the present invention is not restricted to Bluetooth devices, and is applicable to other communications arrangements, in particular frequency hopping systems.

Considering a user wandering into a shopping mall served by a large-area network, his/her association (or, rather, the association of their wireless terminal) with the mall's network might follow the following life cycle, the steps of which are described in greater detail below:

| | |
|---|---|
| #1 | Register presence with the fixed network |
| #2 | Roam within the network |
| #3 | Receive incoming call |

| | |
|---|---|
| #4 | Make outgoing call |
| #5 | Leave fixed network |

1: Location Registration

The purpose of the original registration is to inform the network of one's presence and desire to accept incoming calls. The calls may be generated internally, that is, by another network user. Alternatively, they may arrive from outside the network. As part of the registration process, the user might specify that calls to his cellular phone number be diverted to the local network when within range. From the cellular network point of view, the user could be seen to have roamed to another cell within the cellular network or, possibly, to have roamed to a partner network, for example. The benefit to the user of this is lower power consumption and potentially better coverage while in the mall.

2: Roaming

Since the cells within the mall are relatively small, if the user moves, he/she will cross several cells in his progress. Despite this, user's access to the local network and its access to the user should remain unimpaired. This means that Park mode has to be avoided. A slave can be parked by a master when no link is currently required. The slave accepts a special Park identity and then wakes at specially designated times to listen to system messages issued by the master. These will include the polling messages that enable a parked slave to request active status. In a network, Park mode has several problems. One is a limit on the number of parked slaves at a master of 253. Another is that the requirement to wait until it is polled before it can request a link means that call set up can take an arbitrarily long time. The final reason is that roaming now becomes very difficult because the Park identity and the wake-up cycle are unique to the master in question. It is not possible for a slave to move from master to master without leaving Park mode. It is therefore assumed that, after registration, the slave 'leaves' the piconet but remains synchronised to it sufficiently in order to be able to scan for Page and Inquiry messages.

3: Receiving Calls

In order to accept an incoming call, the user must be located by the network and paged. Once a link is established between them, the call can be delivered. The terminal will scan for Page messages on a regular basis and, therefore, these can be used to find the terminal. Like the Inquiry procedure, paging uses a special subset of 32 channels and a similar procedure that allows a master to find a slave without full synchronisation. Paging messages can be broadcast by any interactor beacon and the slave can respond to the strongest.

4: Making Calls

In order to make an outgoing call, the user must be able to establish a link to the network. If the network has been planned well, the terminal will be within range of an inquiry beacon and can request a link set up using conventional procedures, avoiding the need to wait until polled. At the network side, the receipt of an Inquiry response message by an Inquirer beacon will result in Page messages being issued by one or more nearby Interactor beacons. The terminal will choose the strongest of these and respond to that alone.

By pre-registering, the terminal could benefit from a faster link set-up procedure because it is already known to the network. This will depend somewhat on the network's implementation.

5: Departure from the Network

A terminal that is considered to have left the network will be deleted from its location register. There can be various triggers for this, including an explicit deregistration message from the terminal, a time out or failure to deliver an incoming call. In most networks, GSM and DECT being prime examples, a deregistration message is unusual because by its nature, it is prone to failure. Very often, the terminal only becomes aware that it is leaving the network when it is already out of range and therefore unable to issue the message. Other, more reliable, triggers may be used.

There is a scaling problem for large networks: when there can be several tens of beacons serving perhaps several hundreds of users, the capacity of some of the system channels must be considered. Provided that a sufficient number of cells are installed, an outgoing call request or similar activity started by a terminal can be confined to a single inquirer beacon by virtue of the fact that the terminal responds only to that beacon.

By comparison, the general case of incoming set-up, in which the network initiates the link set-up, can only be confined to a single interactor beacon if the current location of the terminal is known. Otherwise, the network either has to issue a page message on all interactor beacons or instigate some kind of search procedure in which the page is broadcast on beacons successively further away from the last known location of the terminal until it is located or given up as lost.

The page mechanism will only have a limited capacity so, in a large system, paging on all beacons simultaneously will eventually become impractical. The alternative of searching requires care if it is not to take too long to operate. An ideal solution would be to have some means of updating the network of the current terminal location, as is provided by the present invention.

The applicants propose a new class of broadcast message—cell and cluster identity—to be sent using the procedures proposed in the commonly assigned UK patent application no. 0020099.0. Each cell is given an identity unique within the network. In addition, a cluster is defined as a logical subdivision of cells within the fixed network. A cluster will therefore contain a subset of the total number of inquirer cells and a subset of the total number of interactor cells, with at least one of each. Each cell is a member of at least one cluster. A cluster address might be formed from the most significant bits of the cell identities of the cluster members or might alternatively be unrelated to the cell identity.

A new class of Inquiry Response messages is also provided, which messages assist in the management of terminals and their locations. In addition to the identity information returned, the new messages contain a Message Reason field that explains why they were issued. Such message data suitably specifies one or more of the following:

Location registration

Link set-up request

Link handover request

To ensure backwards compatibility, these messages are essentially advisory and may be used to speed up processing of information. Their meanings may be conveyed by other means instead of, or in addition to, the Inquiry response mechanism. Terminals that do not read the broadcast messages will not be able to read the cluster identity and therefore will not automatically update the network as they move around. Incoming calls may take longer to be delivered.

Figure 1:
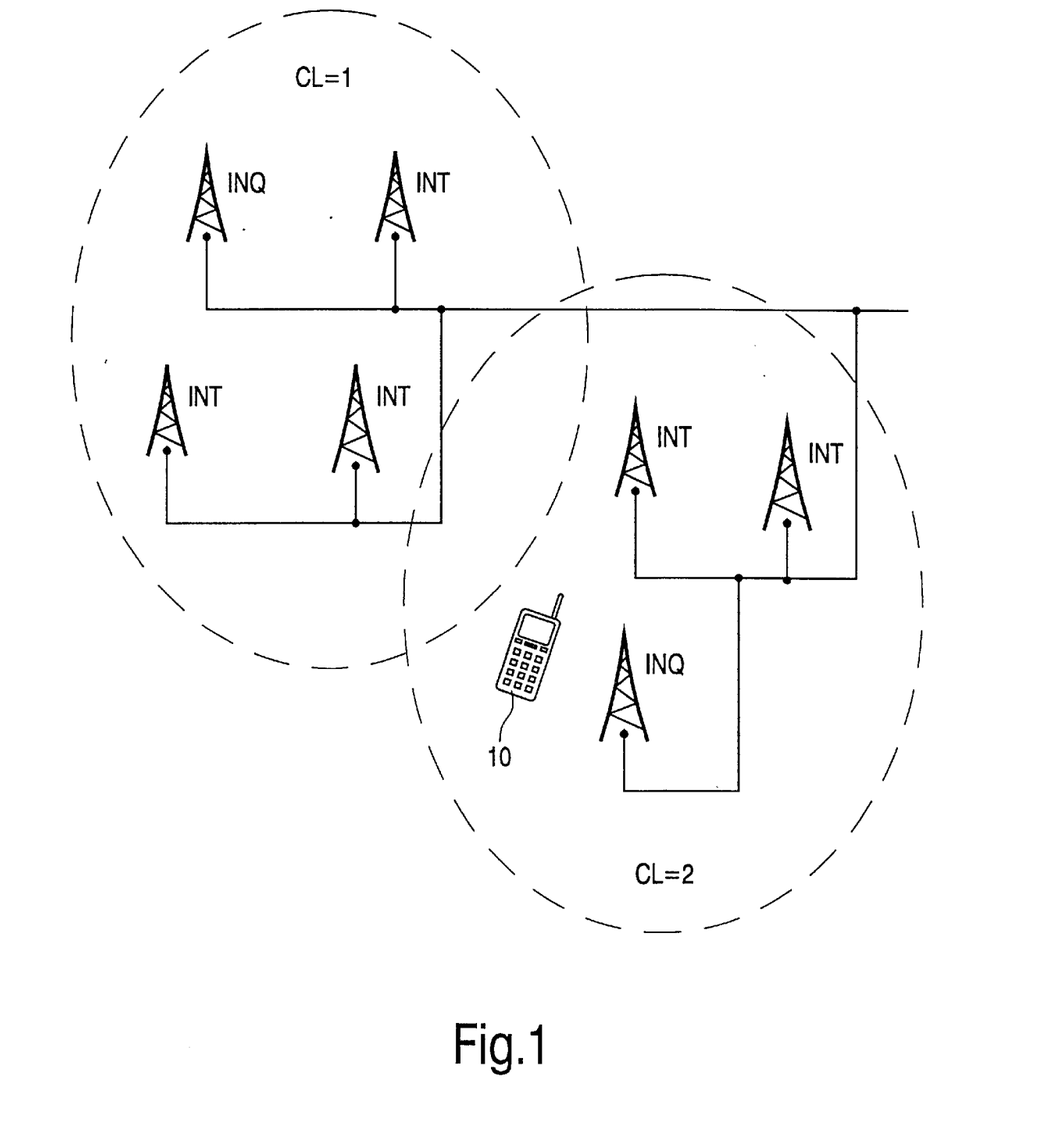
FIG. 1 is a block schematic diagram of a clustered arrangement of beacons.

A typical embodiment is illustrated in FIG. 1 and comprises a plurality of beacons arranged in two adjacent clusters (CL=1 and CL=2) is indicated by the dashed lines.

A mobile device 10 establishes a data link with an interactor beacon INT of a cluster following initial contact being made with an inquiry handling beacon INQ of the cluster. In the initial establishment, the inquirer sends an inquiry message including the cluster identifier, with the portable terminal 10 receiving the message responding by the sending of message reason data, as described below.

A terminal new to the network may issue an Inquiry response with the Message reason field set to {location registration}. This indicates a will to join the network as described above but also indicates that a call set up is not requested. Nevertheless, a link may be set up to enable authentication, service discovery and other procedures to be performed. If so, Page messages will be issued by interactor beacons within the same cluster as the Inquiry beacon. The terminal will respond to the best of these and a link can then be established, appropriate procedures performed, and the link released. If the terminal subsequently moves, it will pick up a new Inquirer beacon. If the broadcast cluster identity indicates a new cluster, the terminal may reissue the location registration message. The network will update its location register, possibly after performing authentication or other procedures.

A link set-up request can be initiated by the terminal issuing an Inquiry response with the Message reason field set to {link set up request}. The network will follow the procedures for network-initiated link set-up request as described below.

A link set up request initiated by the network (for an incoming call, for example) will cause Page messages to be issued on all interactor beacons belonging to the cluster at which the terminal last performed a location registration. If the terminal fails to respond, a search is conducted in other clusters until the terminal is found or all clusters have been tried. A terminal that is not found is 'deregistered' from the system.

A terminal wanting to transfer a link to a new cell may issue an Inquiry response with the Message reason field set to {link handover request}. A link handover may be attempted according to the procedure discussed in greater detail hereinafter. The cell identity is generally not interesting to the slave terminal (but is needed for system and installation purposes). It can be broadcast less frequently or if circumstances dictate, not at all.

Figure 2:
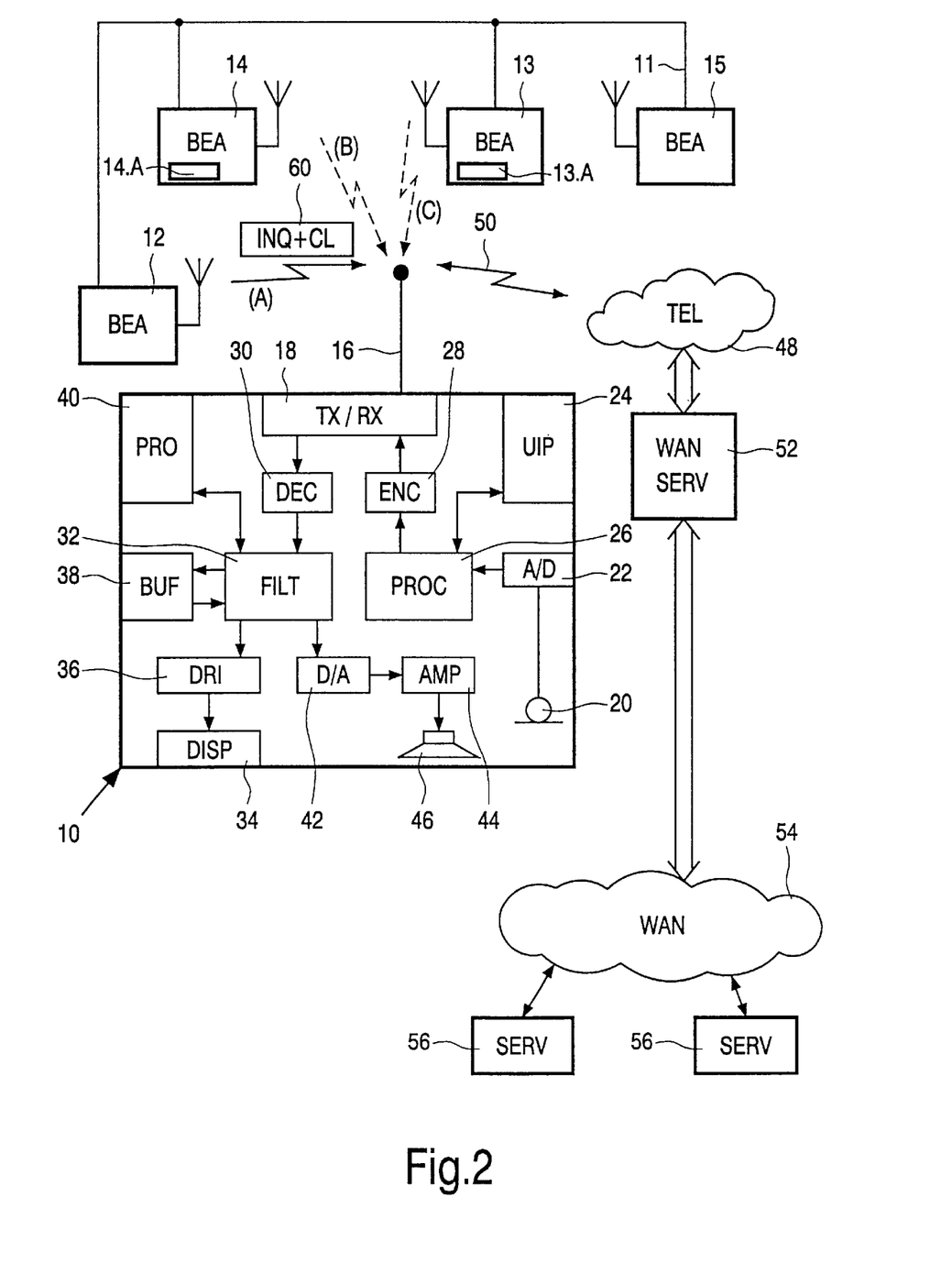
FIG. 2 represents the interaction of beacons in a cluster with a portable device.

Considering now the issue of link handover, FIG. 2 is a block schematic diagram of a portable data processing device in the form of mobile telephone 10 in use with a cluster of low power, short range base stations or beacons 12, 13, 14, 15 interconnected by a secure data channel 11. One or more of these beacons may include data processing and/or control logic circuitry 13A, 14A capable of determining when a so-called handover event occurs, as will be discussed hereinafter. Such an arrangement may be used in places like shopping malls or museums to provide location-specific information such as local maps, information on nearby shops, restaurants, exhibits and so on, with a beacon downloading information keys to a mobile device. An information key is a small data object that provides a reference to a source of full information, and it is in the form of a number of predetermined fields, one of which will contain a short piece of descriptive text presented to a user. Another field will be a pointer or address (of some form) to a further data source, for example a URL or telephone number. Other supplementary fields may control how the data is presented to a user and how the address may be exploited. A beacon will generally broadcast cyclically a number of these keys, each typically relating to a different service although, as will be recognised, waiting for the appropriate key can sometimes be a time-consuming business.

The user's mobile device 10 comprises an aerial 16 coupled with transceiver stage 18 for the reception and transmission of messages. Outgoing messages result from user input to the telephone, either audio input via microphone 20 and A/D converter 22 or other data input via the keypad or other input means 24. These inputs are processed to message data format by signal and data processing stage 26 and converted to transmission format by encoder 28 before being supplied to the transceiver stage 18.

Messages received via the aerial 16 and transceiver 18 are passed via a decoding stage 30 to a filtering and signal processing stage 32. If the data carried by the message is for presentation on a display screen 34 of the telephone, the data will be passed to a display driver 36, optionally after buffering 38, with the driver formatting the display image. As will be recognised, the display 34 may be a relatively simple low-resolution device, and the conversion of received data to display data may be carried out as a subset of the processing stage 32 functionality, without the requirement for a dedicated display driver stage.

Where the message is carrying data from one of the beacons 14, the telephone has the ability to filter the information received according to pre-stored 40 user preferences and the user is only alerted (i.e. the information will only be retained in buffer 38 and/or presented on screen 34) if comparison of stored preference data and subject matter indicators in the message indicate that an item of data of particular interest has been received.

For conventional audio messages, the audio data is output by the filter and processing stage 32, via D/A converter 42 and amplifier 44 to an earphone or speaker 46. Receipt of such messages from the telephone network 48 is indicated by arrow 50: the telephone network 48 also provides the link from the telephone 10 to a wide-area network (WAN) server 52 and, via the WAN 54 (which may be the internet), to one or more remote service providers 56 providing a source of data for the telephone 10.

Communication between the mobile or client device (telephone 10) and the beacons 12–15 takes two forms: 'push' and 'pull'. In 'push' mode, inquiry information is broadcast by the beacon 12 to all portable terminals 10 in the form of a short 'key' indicated at 60. The telephone 10 responds to the inquiry key by sending an identifier for itself to the first beacon 12, which then transfers the interaction to a selected one of the second beacons 14 whilst the first 12 continues to broadcast inquiry keys.

Sometimes the user will wish to obtain more information than is contained in the keys. Here, 'pull' mode allows a user to set up a connection with a server 56 and actively request information to pull down into the terminal 10. This mode is therefore typically interactive.

As mentioned above, one beacon 12 is labelled as an 'inquirer' beacon and it to sends out Bluetooth inquiry messages constantly. The other beacons 13, 14, 15 are labelled as 'interactor' beacons and allowed to communicate with terminals 10 on a one-to-one basis on request. Here, the inquiry procedure is performed by the inquirer beacon 12 and the paging procedure by one or more of the interactor beacons 14. By delegating the functions this way, it is possible to save a considerable amount of time that would otherwise be lost in attempts to join piconets.

It is likely that telephone 10 will move whilst the communications link (identified at B) to the interactor beacon 14 is active, to such an extent that the telephone 10 moves out of range. To identify a suitable further beacon for the communications link to be handed over to, when a handover event occurs, paging messages and responses thereto are used to identify a suitable further interactor beacon 13.

For voice traffic and, ideally, ANV links, the handover should be made in a seamless manner imperceptible to the user, and the best way to achieve this is to establish the new link before dropping the old one, such that two links are temporarily active simultaneously. The (possibly bi-directional) data stream can be run in parallel over the links whilst the best one is identified (according to predetermined quality criteria such as signal strength, error rates or signal to noise ratios). Following the identification, the better quality link is retained and the poorer quality one released.

Figure 3:
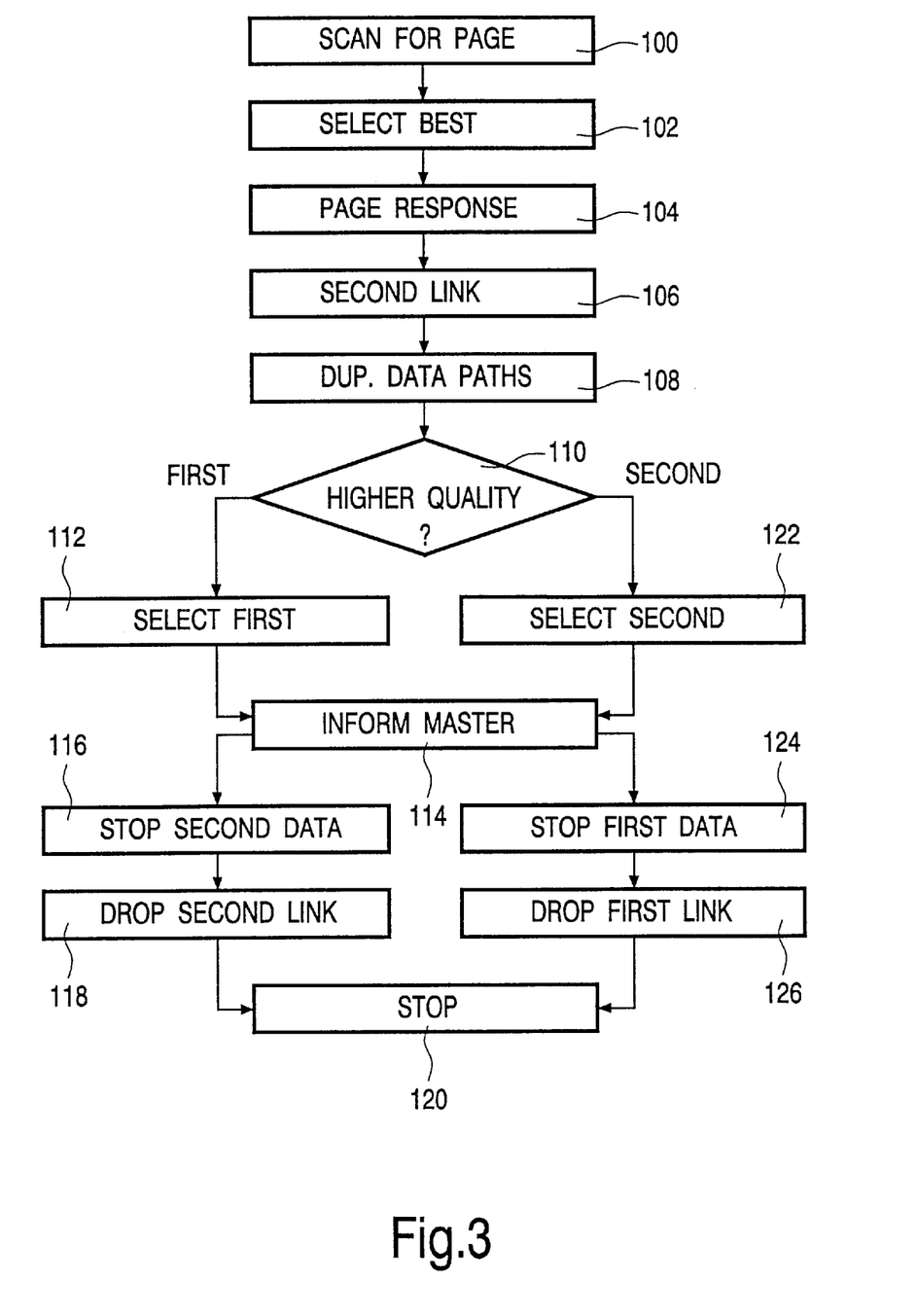
FIGS. 3 to 6 are flow charts illustrating the procedure for transferring an established communications link from one beacon to another.

The flowchart of FIG. 3 gives an example procedure at the mobile device 10, comprising the steps:

Scan for Page messages 100.

Select best cell 102 and issue Page response 104.

Set up second link (C; FIG. 1) 106.

Duplicate data paths on new link 108.

Compare quality of two links 110.

Select better link 112 or 122, inform master 114, switch off data path from worse link 116 or 124.

Release the worse link 118 or 126, and end 120.

Figure 4:
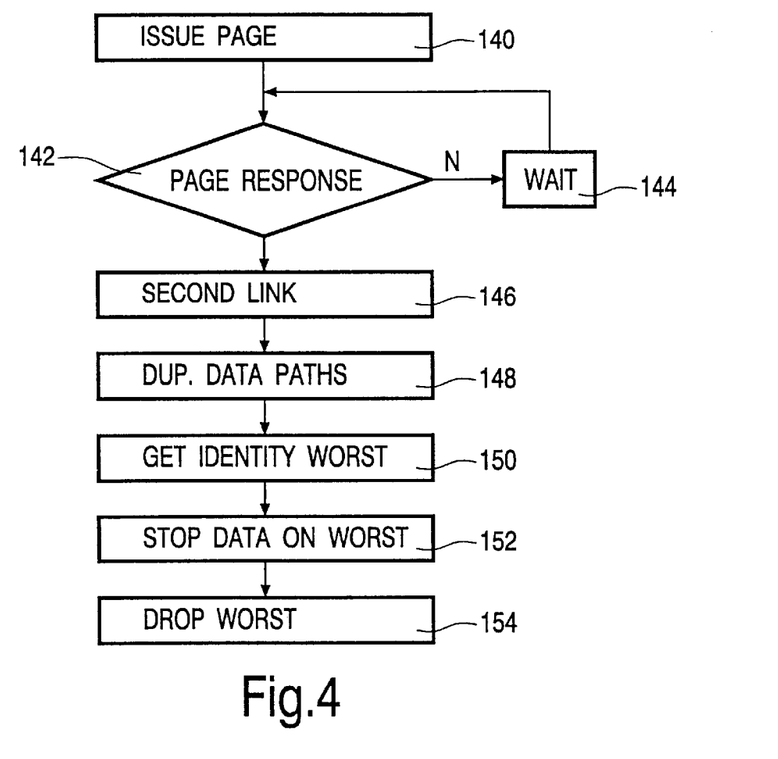

A procedure for the cluster of beacons is shown in the flowchart of FIG. 4, and comprises:

Issue Page messages 140 (indicating handover) at all cells in the cluster or nearby clusters except for the current cell Check for receipt of Page response and wait in the absence of a response 142, 144.

On receipt of Page response, set up second link 146.

Duplicate data paths on new link 148.

Get (or otherwise establish) the identity of the worst link from the mobile device 150.

Switch off data path from worst link 152.

Release the worst link 154.

The comparison to identify best/worst quality link can be performed by a master station of the system instead of the slave terminal but should take place within a certain time. The link release can be initiated by either side once a decision has been made and communicated to the other side. If necessary, the entire procedure can be repeated until a satisfactory channel has been obtained.

Figure 5:
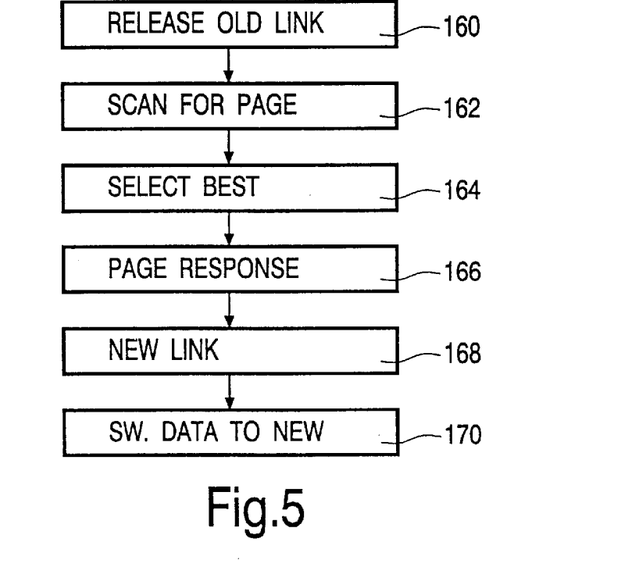

Data calls will not normally need a seamless handover: it is therefore acceptable to release the old link before setting up the new. A non-seamless handover might also be the result when a voice or AN link is dropped involuntarily. The procedures will generally be simpler, with a general (but non-binding) procedure at the terminal for this being as follows (with reference to flowchart FIG. 5):

Release old link (may be system dictated or involuntary i.e. through loss of communication path) 160.

Scan for Page messages 162.

Select best cell 164, and issue Page response 166.

Set up new link 168.

Switch data paths to the new link 170.

A corresponding procedure for the beacon network is (referring to the flowchart of FIG. 6):

Release old link (may be system-dictated or involuntary as above) 180

Figure 6:
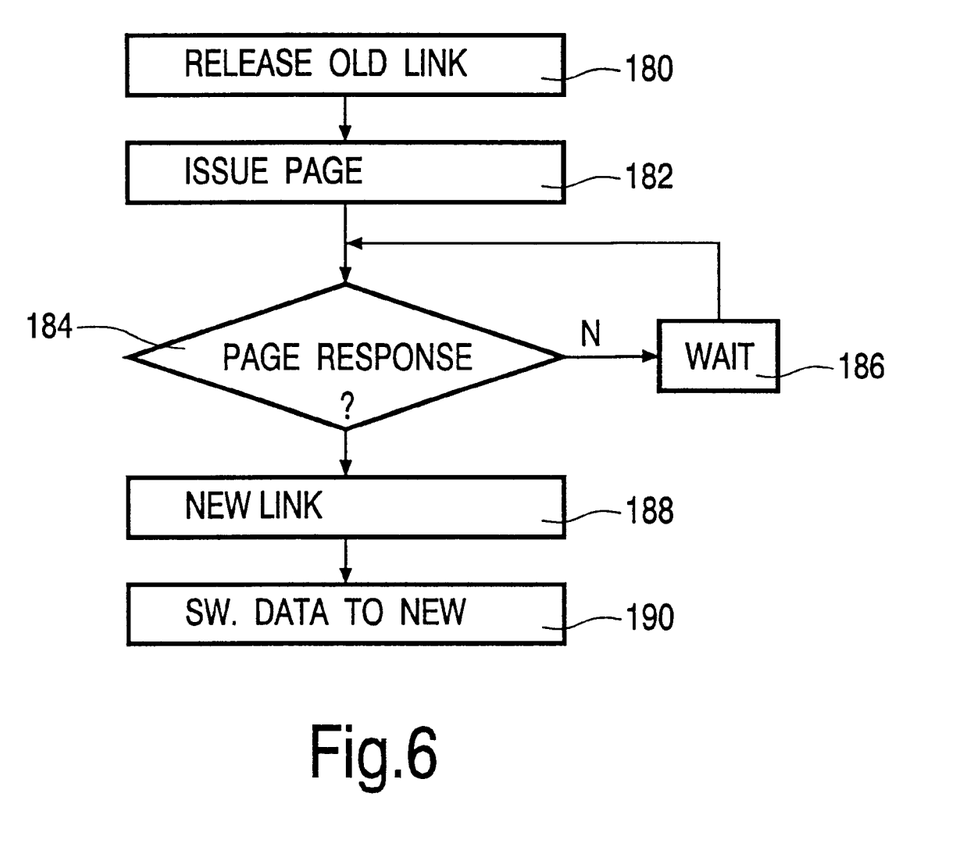

Issue Page messages at all cells in the cluster or nearby clusters except for the current cell, 182

Wait for receipt of Page response 184, 186.

On receipt of Page response, set up new link 188.

Switch data paths to new link 190

A handover procedure can be triggered by either side on determination of a handover event occurring. A seamless handover will generally be triggered by decreasing link quality as measured by either the fixed beacon (master) or the portable device (slave). The master may issue a request to the fixed network, causing the network to begin the procedure described with reference to FIG. 4. The master will then inform the slave by some means in the downlink or will assume that the slave will be scanning for Page messages anyway. Alternatively, if the slave detects poor link quality, it may issue a handover request in the uplink or it may issue an Inquiry response message to an Inquiry beacon with the Message Reason field set to {link handover request}.

Involuntary loss of a link may cause the fixed network to begin the procedure of FIG. 6 automatically or when an Inquiry response {link handover request} message is received from the slave terminal. Purposeful non-seamless handover is initiated by either side issuing link release with the reason set to {link handover}.

From reading the present disclosure, other modifications will be apparent to persons skilled in the art. Such modifications may involve other features which are already known in the design, manufacture and use of fixed and portable communications systems, and systems and components for incorporation therein and which may be used instead of or in addition to features already described herein.

What is claims is:

1. A method for enabling the user of a mobile data processing device to perform a service interaction with a networked arrangement of beacons, said arrangement being subdivided into respective clusters of beacons, with a cluster of beacon devices containing a first and plural second beacon devices capable of wireless message transmission, wherein:

a first beacon of a cluster broadcasts a series of inquiry messages according to a first communications protocol, and including respective identifiers for the beacon and cluster;

the users mobile device, on detecting such inquiry messages, replies with an identifier for the mobile device, together with message reason data;

the first beacon device transmits a received identifier and message reason data to a selected second beacon device; and the selected second beacon and mobile device perform a service interaction based at least partly on the message reason data, including establishing a communications link for performance of said service interaction when indicated by the message reason data.

2. A method as claimed in claim 1, wherein the message reason data is determined by the mobile device in response to a received cluster identifier.

3. A method as claimed in claim 1, comprising the step of transferring the communications link to a further second beacon device when so indicated by the message reason data.

4. A method as claimed in claim 3, wherein the step of transferring the communications link involves the setting up of a second communications link in parallel with the first, selecting which of the two links provides better results according to predetermined criteria, only transferring the link to the further second beacon device if the link thereto provides said better results, and dropping the link not providing the better results.

5. A method as claimed in claim 4, wherein the step of setting up the second communications link involves duplicating the data paths from the existing communications link.

6. A data transmission system comprising a plurality of networked beacon devices, said devices being subdivided into respective clusters of beacons, with a cluster containing a first and two or more second beacon devices capable of wireless message transmission, and at least one mobile device capable of receiving such message transmissions, wherein said first beacon is arranged to broadcast a series of inquiry messages according to a first communications protocol, and including respective identifiers for the beacon and cluster, wherein said at least one mobile device is arranged to detect such inquiry messages and reply with an identifier for the mobile device and message reason data, wherein said first beacon device is arranged to transmit a received identifier and message reason data to a selected one of said two or more second beacon devices, and wherein said selected second beacon and mobile device are configured to perform a service interaction based at least partly on the message reason data, including establishing a communications link for performance of said service interaction when indicated by the message reason data.

7. A beacon device for use in a system as claimed in claim 6, said beacon device being arranged to broadcast said series of inquiry messages according to said first communications protocol, including respective identifiers for said message and cluster.

8. A beacon device as claimed in claim 7, arranged to transmit a received identifier and message reason data to a selected one of said two or more second beacon devices.

* * * * *